United States Patent Office 3,188,295
Patented June 8, 1965

3,188,295
METHOD OF FOAMING A THERMOPLASTIC ORGANIC POLYMER CONTAINING A NUCLEATING AGENT AND AN ORGANIC BROMIDE
Donald E. Ballast and John Dennis Griffin, Midland, Mich., assignors to The Dow Chemical Company, Midland, Mich., a corporation of Delaware
No Drawing. Filed June 27, 1962, Ser. No. 205,534
15 Claims. (Cl. 260—2.5)

This invention relates to the production of cellular articles from thermoplastic organic polymers, particularly alkenyl aromatic resins, and pertains especially to certain agents for controlling the size of the individually-closed thin-walled cells. It relates more particularly to the preparation of self-extinguishing cellular articles comprising a foamed synthetic organic polymer having said agents and an organic bromide flame-proofing agent intimately incorporated therewith.

This application is a continuation-in-part of our application Serial No. 861,763, filed December 24, 1959, now abandoned.

Foamed or cellular articles are commonly prepared from thermoplastic alkenyl aromatic resins, e.g. polystyrene, by intimately blending a volatile organic compound such as methyl chloride, dimethyl ether, butylene and the like with the heat-plastified or molten polymer under pressure to form a mobile or flowable gel which is brought to a uniform temperature throughout its mass, suitably a temperature between about 60° and 130° C., then is extruded into a zone of lower pressure such as the atmosphere wherein the extruded material expands to form a cellular body composed for the most part of individually-closed thin-walled cells. The size of the cells can be controlled in part by varying the temperature of the gel and its content of the dissolved volatile agent just prior to flow of the gel into the zone of lower pressure. In addition the size of the cells can be controlled in part by the incorporation in the gels of fillers or nucleating agents such as finely divided silicon dioxide, calcium silicate, diatomaceous earth, or hexachlorobenzene, etc., prior to its extrusion into a zone of lower pressure.

It is known to prepare flame-resistant, non-flammable or self-extinguishing cellular bodies of thermoplastic alkenyl aromatic resins by incorporating with the gel of a volatile organic compound and a normally solid flammable thermoplastic alkenyl aromatic resin such as polystyrene, certain organic bromides that are compatible with the resins in proportions sufficient to render the resins non-flammable, or self-extinguishing and thereafter extruding the gel into a zone of lower pressure.

In the heretofore known methods for making cellular bodies from thermoplastic alkenyl aromatic resins it is common practice to incorporate with the gel a small proportion of a finely divided filler such as calcium silicate or diatomaceous earth as an aid in controlling the size of the cells in the foamed product and to produce cells of smaller size.

However, the incorporating of silica or silicon-containing compounds in small amounts into the gel or on surfaces of the resin body has certain disadvantages. More particularly, it has ben observed that the silica, even when present in trace amounts, has a pronounced action of increasing the flammability of an already flammable, polymer, e.g. polystyrene. Thus, the heretofore commonly employed practice of incorporating silica-containing compounds such as calcium silicate, diatomaceous earth or silicone oils with flammable thermoplastic organic polymers such as the alkenyl aromatic resins, as an aid in controlling the pore size of the cells when the polymers are foamed to produce cellular articles, has not only the desired effect of decreasing the size of the cells, but has the undesirable action of increasing the flammability of the foamed product.

Accordingly, it is a primary object of the invention to provide certain agents for controlling the size of the cells in the production of cellular thermoplastic organic polymer bodies, which agents not only are efficient for controlling the size of the cells, but which agents have little or no action for increasing the flammability of an already flammable polymer. Another object is to provide nucleating agents for controlling the size of the cells in the production of foamed synthetic organic polymers, particularly alkenyl aromatic resins, containing an organic bromide as self-extinguishing agent. Still another object is to provide a method and agents for making self-extinguishing cellular articles from synthetic thermoplastic organic polymers, which cellular articles have uniformly fine individually-closed thin-walled cells and are self-extinguishing. Other and related objects will appear from the following description of the invention.

According to the invention the foregoing and related objects are attained by incorporating with a synthetic thermoplastic organic polymer, e.g. polyethylene, polypropylene, an alkenyl aromatic resin such as polystyrene, or a copolymer of methyl methacrylate and styrene, or a mobile or flowable gel thereof, comprising the organic polymer having dissolved therein under pressure a volatile organic compound such as methyl chloride, pentane, or petroleum ether, a small but effective proportion of a finely divided organic compound such as indigotin (indigo), or blue copper phthalocyanine pigment, or a mixture of such pigments, and an organic bromide flame-proofing agent, and thereafter foaming the polymer or the gel in known ways to produce a cellular self-extinguishing article composed for the most part of uniformly fine individually-closed thin-walled cells.

The indigotin and/or blue copper phthalocyanine pigments employed as nucleating agents for making cellular articles from the thermoplastic, organic polymer starting material are particularly useful agents for decreasing the size of the cells in the foamed products, and in combination with organic bromides commonly employed for making self-extinguishing foams from such polymers, not only are effective nucleating agents for decreasing the size of the cells but have little, if any, action on the self-extinguishing characteristics of the foamed polymer containing a self-extinguishing agent. Thus, the nucleating agents for the invention permit the employment of organic bromides in small amounts to produce cellular self-extinguishing foams from flammable synthetic organic polymers.

The synthetic organic polymers to be employed in the invention can be any normally solid resinous thermoplastic organic addition polymer such as polyethylene, polypropylene, polymethyl methacrylate, copolymers of methyl methacrylate and one or more monovinyl aromatic compounds of the benzene series, homopolymers and copolymers of one or more monovinyl aromatic compounds or copolymers containing in chemically combined, i.e. polymerized or copolymerized, form at least 50 percent by weight of at least one polymerizable alkenyl aromatic compound having the general formula:

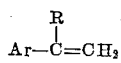

wherein Ar represents an aromatic hydrocarbon radical or a nuclear substituted aromatic halohydrocarbon radical of the benzene series, and R is hydrogen or the methyl radical. The homopolymers and copolymers of one or more monoalkenyl aromatic compounds and copolymers containing in chemically combined form at least 50 percent by weight of at least one alkenyl aromatic compound having the above general formula are commonly known as "alkenyl aromatic resins." Examples of such alkenyl aromatic resins are the solid homopolymers of styrene, vinyltoluene, vinylxylene, ar-ethyl-vinylbenzene, isopropylstyrene, tert.-butylstyrene, ar-chlorostyrene, ar-dichlorostyrene, or ar-bromostyrene; the solid copolymers of two or more of such alkenyl aromatic compounds with one another; and solid copolymers of one or more of such alkenyl aromatic compounds with minor amounts of other readily polymerizable monoolefinic compounds such as methyl methacrylate or acrylonitrile. Copolymers of methyl methacrylate and one or more alkenyl aromatic compounds such as styrene, vinyltoluene or ar-dichlorostyrene, etc., in any proportions, e.g. from 1 to 99 percent by weight of the methylmethacrylate and and correspondingly from 99 to 1 percent of the alkenyl aromatic compound(s), can also be used, especially copolymers of from about 60 to 65 percent of methyl methacrylate and from 40 to 35 percent of styrene.

The invention is particularly useful for making foams from the flammable homopolymers and copolymers such as polyethylene, polypropylene, copolymers of a predominant amount of methyl methacrylate and a minor proportion of styrene, and copolymers of a major proportion by weight at least one monovinyl aromatic hydrocarbon of the benzene series and not more than 50 percent by weight of another monoethylenically unsaturated vinylidene compound such as acrylonitrile or methyl methacrylate.

The nucleating material to be employed in the invention can be indigotin, blue copper phthalocyanine, or a mixture thereof, and can be used in proportions of from 0.001 to 3, preferably from 0.02 to 0.5, percent by weight of the thermoplastic organic polymer.

Volatile organic compounds to be employed as the foaming agent for expanding the heat-softened synthetic organic polymer or a mobile gel thereof can be methyl chloride, dimethyl ether, methyl ethyl ether, monochlorodifluoromethane, butylene, isobutylene, butane, pentane, isobutane, heptane, hexane or petroleum ether or perchlorofluorocarbons having the structural formulae:

$$CCl_3F$$
$$CCl_2F_2$$
$$CClF_3$$
$$CCl_2F-CCl_2F$$
$$CClF_2-CClF_2$$
$$CClF_2-CF_3$$

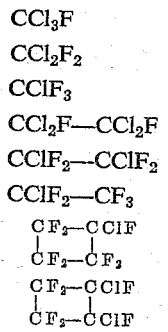

Mixtures of any two or more of such volatile organic compound can also be used. The volatile organic compounds can be employed in amounts of from 0.05 to 0.4 gram molecular proportion of the volatile organic compound(s) per 100 grams of the organic polymer initially used.

The nucleating agents of the invention can be employed for controlling the size of the cells in the production of self-extinguishing or flame-retardant foamed organic polymers in a process similar to that described in U.S. Patent No. 2,669,751. In brief, such a process consists in feeding a solid granular organic polymer, e.g. granular polystyrene, together with an organic bromide flame-proofing agent, to a first section of a plastics extruder wherein the materials are pressed by flights of a forwarding screw and are heated to the melting temperature of the polymer or thereabout. The molten polymer is forwarded around or through a sealing plate or disc on a mid-section of the screw, thereby forming a plastic seal against counter-current flow of gas through the barrel of the extruder, and into a second mixing section of the extruder wherein it is mixed with a volatile organic compound, e.g. methyl chloride, dimethyl ether, pentane, dichlorodifluoromethane and the like, which is fed under pressure to the mixing section of the extruder. The resulting mixture is agitated, cooled and forwarded into a mixer cooler wherein the ingredients are thoroughly blended and is brought to a uniform temperature at which it remains flowable under pressure, e.g. to between 60° and 130° C., preferably from 90° to 120° C., under pressure, then is extruded through an orifice into a zone of sufficiently lower pressure such as the atmosphere to cause expansion of the extruded material with resultant formation of a cellular article.

The nucleating agents of the invention and/or the organic bromide flame-proofing agent can be incorporated with the organic polymer by feeding said agents together with the granular polymer to the feed hopper of the plastics extruder or by feeding the nucleating agents into the stream of the heat-softened polymeric material, suitably just prior to or after its entry into the mixer cooler or at the same time as feed of the volatile organic foaming agent is admixed with the molten polymer. The subsequent blending of the mixture of the materials with one another serves to uniformly distribute the nucleating agents throughout the body of the flowable gel under pressure prior to its extrusion into a zone of lower pressure. The nucleating agents may contain trace amounts, e.g. 0.5 percent by weight or less, of a surface active agent such as sodium alkyl sulfonate, alkyl phenyl polyethylene glycol ether, sodium lauryl sulfate and the like, but such additives are not required in the invention.

As previously mentioned, the nucleating agents of the invention are particularly useful when employed in combination with an organic bromide for making self-extinguishing cellular articles from flammable thermoplastic organic polymers, particularly alkenyl aromatic resins. For such purpose suitable organic bromides are the aliphatic and cycloaliphatic hydrocarbons containing a plurality of bromine atoms attached to carbon atoms in an aliphatic or cycloaliphatic radical of the organic bromide and which bromine atoms constitute at least 45 percent by weight of the molecule, including haloalkyl aromatic hydrocarbons and polybromoalkyl esters or ethers.

Examples of suitable organic bromides are alpha,beta-dibromoethylbenzene, 1,2 - di - (dibromomethyl)benzene, di - (2,3 - dibromopropyl)ether, 2,3 - dibromopropyl propionate, tris - 2(2,3 - dibromopropyl)phosphate, carbon tetrabromide, tetrabromoethylene, 1,2-dibromo-1,1,2,2-tetrachloroethane, 1,1,2,2-tetrabromoethane, dibromodichloromethane, 1,2-dibromo-1,1-dichloroethane, 1,2-dibromo - 1,2,2-trichloroethane, 1,2,3,4-tetrabromobutane, 1,2,3-tribromopropane, 1,2,4-tribromobutane, tetrabromopentane, pentabromoethane, hexabromoethane, hexabromocyclohexane, pentabromomonochlorocyclohexane, tetrabromodichlorocyclohexane and tribromotrichlorocyclohexane. The organic bromide can be employed in amounts of from about 0.5 to 10 percent by weight of the alkenyl aromatic resin used. The organic bromide can be incorporated with the resin in a manner similar to that described with respect to the mixing of the indigotin or blue copper phthalocyanine nucleating agent, i.e. the organic bromide can be fed to the plastics extruder together with the granular polymer or it can be mixed with the stream of the heat-plastified materials at any point in the process prior to its extrusion into a zone of lower pressure. Best results are usually obtained by mixing the organic bromide with the stream of the materials in the mixer cooler, i.e. after the molten polymer and the volatile organic compound have been mixed together under pressure and have been cooled to a temperature of about 150° C. or below. After mixing of the whole of the ingredients with one another under pressure in the process, the ingredients are subsequently blended into a homogeneous flowable gel which is brought while under pressure to a suitable temperature throughout its mass just prior to the point of discharge from the mixer-cooler and is then extruded into the atmosphere to produce a cellular article containing the nucleating agent and the organic bromide self-extinguishing agent uniformly distributed throughout. When making self-extinguishing foams where an organic bromide is incorporated with the organic polymer or a flowable gel thereof, it is advantageous to also incorporate a small amount, e.g. from about 0.01 to 0.5 percent by weight, based on the weight of the polymer, of an acid acceptor such as sodium acetate, magnesium oxide, magnesium hydroxide, zinc oxide, calcium oxide, calicum carbonate, sodium bicarbonate and the like to neutralize trace amounts of hydrobromic acid which may be formed in the process.

In an alternate procedure, the mobile or flowable gel comprising the heat-softened organic polymer, the indigotin or blue copper phthalocyanine nucleating agent, the volatile organic foaming agent, e.g. pentane, and the organic bromide self-extinguishing agent, in the desired proportions can be extruded into a zone of lower pressure such as the atmosphere and thereafter quickly cooled, prior to appreciable expansion of the extruded material, to a temperature of about 40° C. or below to harden or solidify the extruded polymeric material containing the volatile organic foaming agent, the nucleating agent and the organic bromide flame-proofing agent uniformly dispersed throughout, and thereafter crushing or grinding the cooled product to produce latent foaming granules of the polymeric resin. The mobile gel can be extruded as a plurality of strands as a sheet, ribbon, or bar or it can be cut into globules as it is extruded, and rapidly cooled to produce the latent foaming granular product containing the ingredients uniformly dispersed throughout. Such latent foaming granules are capable of being foamed, e.g. by heating in a porous mold, to form self-extinguishing cellular bodies or articles having uniform fine cells and a shape conforming to that of the mold. In all such methods for making the self-extinguishing or non-self-extinguishing latent foaming granular material, it is advantageous to employ as the foaming agent those volatile organic compounds which are normally liquid at room temperature or thereabout and atmospheric pressure such as pentane, hexane, heptane, petroleum ether or mixtures thereof, or perchlorofluorocarbons that are poor solvents for the organic polymer such as dichlorodifluoromethane, dichlorotetrafluoroethane and the like or mixtures of the perchlorofluorocarbons and a saturated aliphatic hydrocarbon such as pentane, hexane or petroleum ether (B.P. 30–60° C.).

In practice, the indigotin or blue copper phthalocyanine together with an organic bromide are employed as nucleating agents in the production of self-extinguishing cellular articles from thermoplastic alkenyl aromatic resins, e.g. polystyrene and copolymers of styrene and another monomer copolymerizable therewith such as methyl methacrylate or acrylonitrile, to decrease the size of the cells and to produce a product composed for the most part of uniform fine individually-closed thin-walled cells.

In a preferred practice, the nucleating agents are employed, together with an organic bromide and an organic peroxide as synergist self-extinguishing agents, to control the size of the cells in the production of self-extinguishing cellular articles from thermoplastic organic polymers, in a process wherein the heat-softened or heat-plastified resin is intimately incorporated with said agents and with a volatile organic compound such as methyl chloride, pentane, dichlorodifluoromethane or petroleum ether under pressure to form a homogeneous mobile or flowable gel which is brought to a substantially uniform temperature below the heat-plastifying temperature, between 60° and 130° C., preferably from 90° to 110° C., under pressure and is then extruded into a zone of lower pressure such as the atmosphere where it is allowed to expand with resultant formation of a self-extinguishing cellular article.

The following examples illustrate ways in which the principle of the invention has been applied, but are not to be construed as limiting its scope.

EXAMPLE 1

(A) Polystyrene having a viscosity characteristic of 22 centipoises (determined for a 10 weight percent solution of the polystyrene in toluene at 25° C.) was fed to a 2½ inch diameter screw type plastics extruder at a rate of 30 pounds per hour, together with 1 percent by weight of pentabromomonochlorocyclohexane. The polystyrene was pressed and heated at temperatures between 160° and 180° C. in a first section of the barrel of the extruder, then was mixed wtih methyl chloride fed under pressure to a second section of the barrel of the extruder at a rate of 3 pounds per hour. The materials were mixed, cooled and forwarded under pressure in the second section of the extruder and fed at a temperature of about 160° C. into a blender-cooler.

The resulting mixture was blended into a uniform composition in the blender-cooler under a pressure of about 600 pounds per square inch gauge pressure and was extruded through a die into the atmosphere wherein the extruded material foamed to form a cellular body. Test pieces having the dimensions of ¼ x 1 inch cross-section by 6 inches long were cut from the foamed product. The foam was observed for its cell size and the value was recorded. The test pieces were used to determine a flammability or self-extinguishing characteristic for the foamed product. The procedure for determining the self-extinguishing property of the foam was to hold a test piece by one end in a horizontal position with the one inch side vertical then to move a microburner with a one inch flame under the free end of the test piece of the foam and ignite it, thereafter the flame is removed and the time in seconds for the ignited foam to be self-extinguished is recorded. The product prepared without a nucleating agent was a foam having cells of 6.5 millimeters diameter. The ignited foam by test was self-extinguishing in a time of 2.5 seconds.

(B) This portion of the example illustrates the use of a nucleating agent according to the invention. While continuing the feed of polystyrene and extruding of the gel containing the pentabromomonochlorocyclohexane to produce foam as described in part A above, there was fed to the extruder 0.40 percent by weight of indigotin powder, together with the granular polystyrene as nucleating agent for decreasing the size of the cells in the foamed product. The product was examined for cell size and tested for self-extinguishing characteristics as described above. The product was composed of uniform fine cells of 0.5 millimeter diameter, and when ignited was self-extinguishing in one second.

(C) This portion of the example illustrates, for purpose of comparison, the employing of a silicon-containing nucleating agent. While continuing the feed of polystyrene and extruding of the gel containing the pentabromomonochlorocyclohexane to produce foam as described in part A above, there was fed to the extruder 0.4 percent by weight of Silene EF, finely divided hydrated calcium silicate, as nucleating agent for decreasing the size of the cells in the foamed product. The product was examined for cell size and tested for self-extinguishing properties. The product was composed of uniform fine cells of 1.0 millimeter diameter, and was burned until consumed, when ignited. The results of the experiments are summarized in Table I:

*Table I*

| Test No. | Nucleating Agent | | Foamed Product | |
|---|---|---|---|---|
| | Kind | Percent | Cell Size, mm. | Self-Extinguishing Time, Sec. |
| A | None | | 6.5 | 2.5 |
| B | Indigotin | 0.4 | 0.5 | 1.0 |
| C | Silene EF | 0.4 | 1.0 | Burns |

EXAMPLE 2

Molding grade polystyrene similar to that employed in Example 1 was fed to a 6-inch diameter screw type plastics extruder at a rate of 200 pounds per hour, together with powdered indigotin in a proportion, based on the weight of the polystyrene as stated in the following table. The polystyrene was pressed and heated to temperatures between about 140° and 200° C., then was mixed with methyl chloride, fed under pressure to a mid-section of the barrel of the extruder at a rate of 20 pounds per hour. The mixture was cooled to about 160° C. and forwarded into a blender-cooler wherein it was admixed with 3 percent by weight of 1,1,2,2-tetrabromoethane as self-extinguishing agent fed to the blender-cooler. The resulting mixture was blended into a homogeneous composition and was brought to a temperature between 100° and 104° C. under pressure, then was extruded through a discharge orifice into the atmosphere wherein it foamed to produce a cellular article. The foamed product was examined for cell size and was tested for self-extinguishing characteristics employing procedure similar to that employed in Example 1. Table II identifies the experiments and gives the proportion of indigotin employed as nucleating agent based on the weight of the polystyrene. The table also gives the cell size and self-extinguishing characteristic for the foamed product.

*Table II*

| Run No. | Nucleating Agent—Indigotin, Percent | Foamed Product | |
|---|---|---|---|
| | | Cell Size, mm. | Self-extinguishing Time, Sec. |
| 1 | 0.07 | 1.7 | 1.4 |
| 2 | 0.15 | 1.0 | |
| 3 | 0.3 | 0.5 | 1.0 |

EXAMPLE 3

Molding grade polystyrene having a viscosity characteristic of 22 centipoises, together with 0.17 percent by weight of indigotin, 0.05 percent of magnesium oxide, and 2 percent of pentabromomonochlorocyclohexane was fed to a 6-inch diameter screw type plastics extruder at a rate of 200 pounds per hour. The polystyrene was pressed and heated at temperatures between 140° and 200° C. in the extruder and was mixed with methyl chloride, fed under pressure at a rate of 20 pounds per hour into the extruder barrel and into admixture with the molten polystyrene. The resulting mixture was forwarded and cooled to a temperature of about 160° C., then was blended under pressure in a mixer-cooler to form a homogeneous composition which was brought to a temperature between 100° and 104° C., then was extruded into the atmosphere wherein it expanded to form a cellular article. The foamed product was examined for its cell size and was tested for its self-extinguishing characteristic employing procedure similar to that employed in Example 1. The foamed product was composed of substantially uniform individually-closed thin-walled cells of 1 millimeter diameter, and when ignited in an open flame was self-extinguishing in 1.7 seconds after removing the flame.

Similar results were obtained when calcium oxide, zinc oxide, barium oxide, calcium carbonate, barium carbonate and the like are substituted for the magnesium oxide acid acceptor employed in the example.

EXAMPLE 4

Polystyrene together with 0.15 percent by weight of powdered indigotin was fed to a plastics extruder and mixed with 10 parts by weight of methyl chloride and with 1,1,2,2-tetrabromoethane in amount as stated in the following table, to form a mobile gel under pressure which was extruded into the atmosphere to produce a foamed product employing procedure similar to that employed in Example 2. The product was examined for cell size, and was tested for self-extinguishing properties. Table III identifies the experiments and gives the proportions of indigotin nucleating agent and 1,1,2,2-tetrabromoethane employed in making the same. The table also gives the cell size of the foam and its self-extinguishing time in seconds.

*Table III*

| Run No. | Nucleating Agent—indigotin | Self-Extinguishing Agent—1,1,2,2-tetrabromoethane | Foamed Product | |
|---|---|---|---|---|
| | | | Cell Size, mm. | Self-Extinguishing Time, Sec. |
| 1 | 0.15 | 1.0 | 0.83 | 5.5 |
| 2 | 0.15 | 1.5 | 0.93 | 3.1 |
| 3 | 0.15 | 2.9 | 0.94 | 9.1 |
| 4 | 0.15 | 2.5 | 0.97 | 1.5 |

EXAMPLE 5

Granular polystyrene having a viscosity characteristic of 22 centipoises (determined for a 10 weight percent solution of the polystyrene in toluene at 25° C.), together with 0.15 percent by weight of indigotin, and with pentabromomonochlorocyclohexane in amount, based on the weight of the polystyrene, as stated in the following table, was fed to a 6-inch diameter screw type plastics extruder wherein it was heated to its melting point and was mixed with 10 percent by weight of methyl chloride employing procedure similar to that employed in Example 2, to form a homogeneous mobile or flowable gel, which was then extruded through an orifice into the atmosphere wherein it foamed to produce a cellular article. The foamed product was examined for its cell size and was tested for self-extinguishing characteristics employing procedure similar to that employed in Example 2, to form a homogeneous mobile or flowable gel, which was then extruded through an orifice into the atmosphere wherein it foamed to produce a cellular article. The foamed product was examined for its cell size and was tested for self-extinguishing characteristics employing procedure similar to that employed in Example 1. Table IV identifies the experiments and gives the proportions of indigotin and pentabromomonochlorocyclohexane employed in preparing the same. The table also gives the cell size of the foam and a self-extinguish time in seconds.

Table IV

| Run No. | Nucleating Agent— indigotin | Self-Extin- guishing Agent— Pentabromo- mono-chlorocy- clohexane | Foamed Product | |
|---|---|---|---|---|
| | | | Cell Size, mm. | Self-Extin- guishing Time, Sec. |
| 1 | 0.15 | 0 | 0.9 | Burns. |
| 2 | 0.15 | 0.5 | 1.3 | 6.2 |
| 3 | 0.15 | 1 | 0.9 | 3.1 |
| 4 | 0.15 | 2 | 1.0 | 1.0 |

The product was a cellular body consisting of substantially uniform fine cells of about 0.4 millimeter diameter and had a density of 2 pounds per cubic foot of the foam.

EXAMPLE 6

A copolymer of 62 percent by weight of methyl methacrylate and 38 percent of styrene, having a viscosity characteristic of 10 centipoises as determined for a 10 weight percent solution of the copolymer in methyl ethyl ketone at 25° C., was fed in granular form at a rate of 30 pounds per hour, together with 0.05 percent by weight of indigotin as nucleating agent, to a 2½ inch diameter screw type plastics extruded. The copolymer was pressed and heated to its melting point then was mixed with methyl chloride fed under pressure into the barrel of the extruder at a rate of 3 pounds per hour. The mixture of materials was blended under pressure into a homogeneous gel and was brought to a temperature of 120° C. under a pressure of 800 pounds per square inch gauge pressure, then was extruded into the atmosphere wherein it was allowed to foam to a cellular product. Test pieces of the foamed product were examined and found to consist of uniform individually-closed thin-walled cells of 0.27 millimeter diameter.

In contrast, when the copolymer of methyl methacrylate and styrene was foamed under similar conditions, but without the indigotin as nucleating agent, the foamed product was composed of cells of 8 millimeter diameter.

EXAMPLE 7

Polypropylene having a melt index of 0.6 was fed at a rate of 30 pounds per hour to the 2½ inch diameter screw type plastics extruder, together with 0.025 percent by weight of indigotin as nucleating agent, wherein it was heated to its melting point under pressure and was mixed with dichlorotetrafluoroethane also fed to the barrel of the extruder under pressure at a rate of 9 pounds per hour. The mixture of materials was blended under pressure into a uniform flowable gel and was brought to a temperature of 156° C., then was extruded into the atmosphere wherein it foamed to produce a cellular product. Test pieces of the foamed polypropylene were examined and found to be composed of uniform fine cells having a diameter of 0.5 millimeter. In contrast, when the polypropylene was foamed in similar manner, but without the indigotin nucleating agent, the foam was composed of cells of 1.2-millimeter diameter.

EXAMPLE 8

In each of a series of experiments, polyethylene having a melt index of 2 was fed at a rate of 120 pounds per hour, together with indigotin in proportions as hereinafter stated as nucleating agent, to a 4½ inch screw type plastics extruder. The polyethylene was heated to its melting point and was mixed with dichlorotetrafluoroethane, also fed to the barrel of the extruder at a rate of 28.2 pounds per hour. The mixture of materials was blended under pressure into a uniform flowable gel and was brought to a temperature of 108° C., then was extruded into the atmosphere wherein it foamed to a cellular product. Test pieces of the foamed product were examined and their cell size observed. Table V identifies the experiments and gives the proportion of indigotin employed as nucleating agent. The table also gives the average diameter of the cells in a cross-sectional piece of the foamed product.

Table V

| Run No. | Nucleating Agent— Indigotin, Percent | Product— Average Diameter of cells, mm. |
|---|---|---|
| 1 | none | >6.0 |
| 2 | 0.5 | 1.4 |
| 3 | 1.0 | 0.75 |
| 4 | 1.5 | 0.65 |

EXAMPLE 9

(A) Polystyrene having a viscosity characteristic of 22 centipoises was fed at a rate of 30 pounds per hour to a 2½ inch diameter screw type extruder wherein it was pressed and heated at temperatures between 160° and 180° C., then was mixed with normal pentane also fed to a midsection of the barrel of the extruder under pressure at a rate of 1.8 pounds per hour. The materials were mixed, forwarded and cooled under pressure to form a mobile gel which was extruded at a temperature of 120° C. as a plurality of strands into the atmosphere. The extruded material was cut into segments and quickly cooled to a solid state prior to any appreciable expansion thereof and was recovered as solid granules containing the pentane blowing agent uniformly distributed throughout. A portion of the granular product was prefoamed by heating them in water at a temperature of 95° C. for 3 minutes. The prefoamed material was placed in a porous mold to completely fill the mold with the expandable prefoamed polystyrene. The mold was closed and heated with steam for 5 minutes at 110° C. and then cooled. The product was a cellular body having the shape of the mold. A test piece was cut from the cellular body and was examined for its pore size. The cells had an average diameter of 0.51 millimeter.

(B) Polstrene having a viscosity of 22 centipoises as determined for a 10 weight percent solution of the polystyrene in toluene at 25° C. was fed at a rate of 30 pounds per hour, together with 0.00386 percent by weight of indigotin as nucleating agent per 100 pounds of the polystyrene, to the 2½ inch diameter screw type extruder and was mixed with normal pentane fed at a rate of 1.8 pounds per hour to a midsection of the extruder barrel and blended into a flowable gel which was extruded as a plurality of strands which were cut into segments and quickly cooled to form foamable granules employing conditions as described in part A above. A portion of the granular product was prefoamed, then was further foamed in a porous mold to produce a cellular body as described above. A test piece was cut from the cellular body and was examined for its pore size. The cells had an average diameter of 0.14 millimeter.

EXAMPLE 10

Molding grade polystyrene having a viscosity characteristic of 22 centipoises, together with 0.40 percent by weight of blue copper phthalocyanine and 1 percent of pentabromomonochlorocyclohexane was fed to a 2½-inch diameter screw type plastics extruder at a rate of 30 pounds per hour. The polystyrene was pressed and heated at temperatures between 160° and 200° C. in the extruder and was mixed with methyl chloride, fed under pressure at a rate of 3 pounds per hour into the extruder barrel and into admixture with the molten polystyrene. The resulting mixture was forwarded and cooled to a temperature of about 160° C. then was blended under pressure in a mixer-cooler to form a homogeneous composition which was brought to a temperature between 100° and 104° C., then was extruded into the atmosphere wherein it expanded to form a cellular article. The foamed product was examined for its cell size and was tested for its self-extinguishing characteristic employing procedure similar to that employed in Example 1. The foamed product was composed of substantially uniform individually-closed thin-walled cells of 1.2 millimeter diameter, and when ignited in an open flame was self-extinguishing in 2 seconds after removing the flame.

We claim:

1. In a process for making a cellular article from a polymer composition capable of being foamed to produce a cellular body composed for the most part of individually-closed thin-walled cells and wherein the polymer composition comprises a synthetic normally solid thermoplastic organic polymer selected from the group consisting of (a) copolymers of from 40 to 35 percent by weight of at least one monoalkenyl aromatic hydrocarbon of the benzene series and from 60 to 65 percent of methyl methacrylate, (b) polyethylene, (c) polypropylene, and (d) alkenyl aromatic polymers containing in chemically combined form at least 50 percent by weight of at least one alkenyl aromatic compound having the general formula:

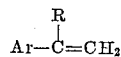

wherein A represents an aromatic radical of the group consisting of hydrocarbon and nuclear halohydrocarbon radicals of the benzene series and R is a member of the group consisting of hydrogen and the methyl radical, having a volatile fluid organic compound having a boiling point below 100° C. at 760 millimeters absolute pressure, uniformily distributed throughout as foaming agent, which polymer composition is heated to at least its softening point and foamed, the improvement for controlling the size of the cells which consists in intimately incorporating throughout the polymer composition prior to its being foamed from 0.001 to 3 percent by weight based on the weight of the polymer, of a finely divided nucleating agent selected from the group consisting of indigotin, blue copper phthalocyanine and mixture thereof.

2. In a process for making a cellular article from a polymer composition capable of being foamed to produce a cellular body composed for the most part of individually-closed thin-walled cells, wherein a synthetic normally solid thermophastic organic polymer selected from the group consisting of (a) copolymers of from 40 to 35 percent by weight of at least one monoalkenyl aromatic hydrocarbon of the benzene series and from 60 to 65 percent of methyl methacrylate, (b) polyethylene, (c) polypropylene, and (d) alkenyl aromatic polymers containing in chemically combined form at least 50 percent by weight of at least one alkenyl aromatic compound having the general formula:

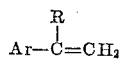

wherein Ar represents an aromatic radical of the group consisting of hydrocarbon and nuclear halohydrocarbon radicals of the benzene series and R is a member of the group consisting of hydrogen and the methyl radical, in a heat-softened condition is intimately incorporated with a volatile fluid organic compound having a boiling point below 100° C. at 760 millimeters absolute pressure as foaming agent and from 0.5 to 10 percent by weight of an organic bromide containing a plurality of bromine atoms attached to carbon atoms of a radical of the group consisting of aliphatic and cycloaliphatic radicals in the molecule of the organic bromide, said bromine atoms constituting at least 45 percent by weight of the organic bromide-containing compound, under pressure to form a flowable gel, then is extruded into a zone of lower pressure, sufficient to cause expansion of the extruded material to produce a cellular body, the improvement for controlling the size of the cells which consists in intimately incorporating with the gel under pressure from 0.001 to 3 percent by weight based on the weight of the organic polymer, of a finely divided nucleating agent selected from the group consisting of indigotin, blue copper phthalocyanine and mixtures thereof, and thereafter extruding the gel containing said nucleating agent uniformly dispersed throughout into a zone of lower pressure.

3. A process according to claim 2, wherein the organic polymer is a copolymer of styrene and methyl methacrylate.

4. A process according to claim 2, wherein the organic polymer is an alkenyl aromatic resin containing in chemically combined form at least 50 percent by weight of at least one alkenyl aromatic compound having the general formula:

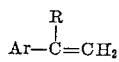

wherein Ar represents an aromatic radical of the group consisting of hydrocarbon and nuclear halohydrocarbon radicals of the benzene series and R is a member of the group consisting of hydrogen and the methyl radical.

5. A process according to claim 2, wherein the flowable gel of the heat-softened organic polymer and the volatile fluid organic foaming agent under pressure contains from 0.5 to 10 percent by weight of an organic bromide containing a plurality of bromine atoms attached to carbon atoms of a radical of the group consisting of aliphatic and cycloaliphatic radicals in the molecule of the organic bromide, and said bromine atoms constituting at least 45 percent by weight of said organic bromide.

6. A process according to claim 2, wherein the organic polymer is polystyrene.

7. A process according to claim 2, wherein the organic polymer is polyethylene.

8. A process according to claim 2, wherein the organic polymer is polypropylene.

9. A process according to claim 2, wherein the nucleating agent is indigotin.

10. A process according to claim 2, wherein the nucleating agent is blue copper phthalocyanine.

11. A process according to claim 2, wherein the organic polymer is polystyrene, the nucleating agent is indigotin and the organic bromide is 1,1,2,3-tetrabromoethane.

12. A process according to claim 2, wherein the organic polymer is polystyrene, the nucleating agent is indigotin and the organic bromide is 1,1,2,2-tetrabromoethrocyclohexane.

13. A process according to claim 2, wherein the organic polymer is polystyrene, the nucleating agent is blue copper phthalocyanine and the organic bromide is pentabromomonochlorocyclohexane.

14. A process according to claim 2, wherein the flowable gel of the heat-softened organic polymer contains from 0.01 to 0.5 percent by weight of magnesium oxide as an acidic neutralizing agent.

15. A process according to claim 2, wherein the flowable gel of the heat-softened organic polymer contains from 0.01 to 0.5 percent by weight of calcium carbonate as an acidic neutralizing agent.

References Cited by the Examiner

UNITED STATES PATENTS

| Re. 23,757 | 12/53 | Pike | 260—41 |
|---|---|---|---|
| 1,627,195 | 5/27 | Ostromislensky | 260—41 |
| 2,744,291 | 5/56 | Stastny et al. | 260—2.5 |
| 2,760,947 | 8/56 | Werkema et al. | 260—2.5 |
| 2,857,342 | 10/58 | Platzer | 260—2.5 |
| 2,864,777 | 12/58 | Greenhoe | 260—2.5 |
| 3,058,929 | 10/62 | Vanderhoff et al. | 260—2.5 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,188,295                                                June 8, 1965

Donald E. Ballast et al.

It is hereby certified that error appears in the above numbered patent requiring correction and that the said Letters Patent should read as corrected below.

Column 3, line 40, after "weight" insert -- of --; column 5, line 24, for "where" read -- wherein --; column 8, Table III, third column, line 3 thereof, for "2.9" read -- 2.0 --; same table, fourth column, line 3 thereof, for "0.94" read -- 0.97 --; same table, fifth column, line 3 thereof, for "9.1" read -- 2.1 --; column 9, line 24, for "extruded" read -- extruder --; column 11, line 24, for "A" read -- Ar --; lines 31 and 32, for "oftening" read -- softening --; line 43, for "thermophastic" read -- thermoplastic --; column 12, lines 43 and 44, for "1,1,2,3-tetrabromoethane" read -- 1,1,2,2-tetrabromoethane --; lines 47 and 48, for "1,1,2,2-tetrabromoethrocyclohexane" read -- pentabromomonochlorocyclohexane --.

Signed and sealed this 29th day of March 1966.

(SEAL)
Attest:

ERNEST W. SWIDER                                  EDWARD J. BRENNER
Attesting Officer                                    Commissioner of Patents